(12) United States Patent
Dubois et al.

(10) Patent No.: US 8,119,713 B2
(45) Date of Patent: Feb. 21, 2012

(54) POLYLACTIDE-BASED COMPOSITIONS

(75) Inventors: Philippe Dubois, Mons (BE); Marius Murariu, Mons (BE); Michael Alexandre, Mons (BE); Philippe Degee, Mons (BE); Serge Bourbigot, Villeneuve d'AscQ (FR); Rene Delobel, Villeneuve d'AscQ (FR); Gaelle Fontaine, Villeneuve d'AscQ (FR); Eric Devaux, Roubaix Cedex (FR)

(73) Assignees: Materia Nova, Mons (BE); Ecole Nationale Superieure de Chimie de Lillie, Villeneuve d'Ascq (FR); Ecole Nationale Superieure des Arts et Industries Textiles, Roubaix Cedex (FR)

( * ) Notice: Subject to any disclaimer, the term of this patent is extended or adjusted under 35 U.S.C. 154(b) by 0 days.

(21) Appl. No.: 12/525,893

(22) PCT Filed: Feb. 1, 2008

(86) PCT No.: PCT/EP2008/051295
§ 371 (c)(1), (2), (4) Date: Mar. 12, 2010

(87) PCT Pub. No.: WO2008/095874
PCT Pub. Date: Aug. 14, 2008

(65) Prior Publication Data
US 2010/0184894 A1    Jul. 22, 2010

(30) Foreign Application Priority Data
Feb. 7, 2007 (GB) .................................. 0702410.2

(51) Int. Cl.
C08K 3/30 (2006.01)

(52) U.S. Cl. .......................... 524/236; 524/423; 524/261
(58) Field of Classification Search .................. 524/236, 524/423
See application file for complete search history.

(56) References Cited

U.S. PATENT DOCUMENTS

| 5,773,502 | A * | 6/1998 | Takekoshi et al. | 524/411 |
| 2006/0235113 | A1 * | 10/2006 | Dorgan et al. | 524/13 |

FOREIGN PATENT DOCUMENTS

| EP | 498460 A1 | 1/2005 |
| WO | WO 03/059409 A1 | 7/2003 |

OTHER PUBLICATIONS

Ray et al., Macromol. Rapid Commun. 2003, 24, No. 14, pp. 815-840.*
Ray, Suprakas Sinha, et al., Biodegradable Polylactide and It's Nanocomposites, Macromolecular Rapid Communications, 2003, vol. 23, pp. 815-840.
Database WPI Week 198626, Derwent Publications Ltd., London, May 20, 1986.

* cited by examiner

Primary Examiner — Robert D. Harlan
(74) Attorney, Agent, or Firm — Jerold I. Schneider

(57) ABSTRACT

A polylactide-based polymer or copolymer (PLA) compositions with improved flame retardancy properties as obtained by conventional melt-blending of PLA polyester matrix (1) with both calcium sulfate (2) and organo-modified layered silicates (OMLS) (3). Combination of $CaSO_4$ and OMLS exhibits synergistic effects on PLA flame retardancy by both significantly increasing the time to ignition and decreasing the heat release rate per unit area, and promoting non-dripping properties. Moreover, all other properties of PLA remain almost unchanged or are improved as regards to pristine PLA, especially thermal and mechanical properties.

23 Claims, No Drawings

POLYLACTIDE-BASED COMPOSITIONS

CROSS-REFERENCE TO RELATED APPLICATIONS

This application is a §371 national stage entry of International Application No. PCT/EP 2008/051295, filed Feb. 1, 2008, which claims priority to British Patent Application No. 0702410.2, filed Feb. 7, 2007, both of which are hereby incorporated by reference.

FIELD OF THE INVENTION

The present invention relates to a novel way to significantly improve the flame retardancy properties of polylactide-based polymer or copolymer (PLA) by melt-compounding at least three components: (1) PLA, (2) calcium sulfate derivatives and (3) organo-modified layered silicates (OMLS). The as-obtained composites do not only show improved flame-retardancy properties due to the synergetic effect of combining fillers (2) and (3) but also keep all other inherent properties of PLA substantially unchanged or improved such as thermal stability, heat deflection temperature, stiffness; processability, isotropic shrinkage, dimensional stability, low costs, etc. Preferably, PLA and $CaSO_4$ are obtained from renewable resources, for example by a fermentation process, but anyway the preferred disclosed procedure gives rise to a compostable and biodegradable product which can be processed by using at least one of the traditional melt-processing techniques, e.g., injection molding, extrusion or other techniques suitable for specific applications (packaging, insulator films and sheets, electrical and electronic components of office equipments (monitors, computers, printers etc.), automotive parts or mechanical parts—connectors, relays, switches, coil bobbins, etc., where fire retardancy is required.

In PLA resins, addition of $CaSO_4$ anhydrites—OMLS combinations according to the invention can result in reducing PLA costs but also in a considerable increase of specific properties as compared to the use of pure mineral fillers at the same total filler content. The PLA compositions according to the invention therefore allow the preparation of (nano)composites which, while having an excellent compatibility and filler dispersion at micro- and nano-scale, have good flame retardant and mechanical properties.

DESCRIPTION OF THE PRIOR ART

Polylactide (PLA) belongs to the family of synthetic aliphatic polyesters and is considered as biodegradable and compostable. It is a thermoplastic, high strength, high modulus polymer that can be made from annually renewable resources.

The basic building block for PLA is lactic acid which can be manufactured either by carbohydrate fermentation from, e.g., corn, sugar cane and sugar beet, or by chemical synthesis. As a typical example, U.S. Pat. No. 6,632,966 (Gerkema et al.) discloses a production method by fermentation that is leading to lactic acid and hydrated calcium sulfate, one major byproduct. Approximately 1.1 tonne of byproduct is produced of per ton of lactic acid and needs to be disposed due to the lack of valuable utilization.

More recently, PLA has garnered interest as a new environmentally-friendly thermoplastic with wide applicability but its utilization is limited due to a higher price compared to the traditional commercial polymers. On the other hand, for various end-use applications some properties such as flame retardant, thermal stability, rigidity, heat deflection temperature, gas barrier, processability, dimensional stability etc., still need to be improved. In this context, PLA is mixed with different dispersed phases (fillers, additives, reinforcements or other polymers) to obtain improved grades suitable for typical applications.

PLA-filler blends were firstly realized for biomedical applications taking advantage of their biodegradability and biocompatibility. As an example, PLA was blended with hydroxyapatite, a calcium phosphate similar to the inorganic content of bone (Shikinami Y., et al., Biomaterials, vol. 20, p. 859 (1999)). The effect of filler content on mechanical and dynamic mechanical properties of biphasic calcium phosphate-PLA composites was studied by Bleach N. C. et al. (Biomaterials, vol. 23, p. 1579 (2002)). Similarly, WO 03059409 by Cooper J. discloses biodegradable implant materials composed of PLA-based copolyester and anhydrous calcium sulfate or alpha tri-calcium phosphate as mineral fillers with mean size lower than 100 microns by simple compression molding of PLA and filler granules.

Usually, the incorporation of such fillers into PLA (hydroxyapatite, calcium carbonate, calcium phosphate, wollastonite, etc.) has been performed by melt-blending. However, the mechanical incorporation and high filler percentages leads to poor dispersions of the inorganic materials that form aggregates due to their usual incompatibility with the polymeric matrix. Very recently, some of us (Polymer 2007 (to be published)) reported on the PLA compositions filled with high content of calcium sulfate in anhydrite II (AII) form. The effect of filler content and size on mechanical properties was disclosed;

Concerning the fire behaviour, the mineral-filled composites and more particularly calcium sulfate or AII filled compositions are characterized by dripping properties during burning and cannot be recommended for applications where advanced flame retardant properties are requested.

Because polymer (nano)composites have attracted much attention from both academic and industrial points of view, layered silicate PLA (nano)composites were prepared especially to increase PLA mechanical and barrier properties or to improve the rate of biodegradation (Pandey K.J., Polym. Degrad. Stab., vol. 88, p. 234-250 (2005); Paul M.-A., et al., Polymer, vol. 44, p. 443-450 (2003); Ray S., et al., Macromol. Rapid Commun. vol. 24, p. 815(2003)).

For producing new polymer compositions characterized by improved flame retardant properties, some research works have been dedicated to the study of the combinations between "polymer layered-silicate (nano)composites and conventional flame retardants —Gilman J. et al. (source: Polymer-Clay (nano)composites, eds.: T. J. Pinnavaia and G. Beall, Wiley and Sons Ltd, West Sussex, p. 193-206 (2000); "PA-6 CLAY NANOCOMPOSITE HYBRID AS CHAR FORMING AGENT IN INTUMESCENT FORMULATIONS", S. Bourbigot, M. Le Bras, F. Dabrowski, J. Gilman and T. Kashiwagi, Fire and Materials, 24, p. 201-208 (2000)).

The general approach in these studies starts with a conventional flame-retarded polymer formulation, which already shows good flammability properties. (i.e., low heat release rate—HRR or a V0 rating in the UL 94 flammability test). Incorporation of nano-dispersed layered-silicate allows a significant portion of the conventional flame retardants to be removed from the formulation.

In this context, U.S. Pat. No. 5,773,502 by Takekoshi, et al., discloses a flame retardant composition based on a thermoplastic polyester or copolyester, a halogenated organic fire retardant, antimony oxide, organomodified clay and a fluorocarbon polymer. Usually these flame retardant compositions are very effective but in case of fire or even during processing toxic or corrosive gases can be produced.

Because PLA was recently considered as alternative in replacing petrochemical polymers there is a strong demand to enlarge the range of PLA properties by improving the flame retardant and mechanical properties, processability, surface appearance, isotropic shrinkage, dimensional stability, etc. It is essential to upgrade and customize the raw polymer material to meet the requirements of new applications. The present invention addresses these needs through the preparation of low-cost PLA compositions characterized notably by improved flame-retardant properties.

SUMMARY OF THE INVENTION

Surprisingly, it has been found that PLA compositions as obtained by melt-compounding of polylactide-based (co) polymers, and calcium sulfate anhydrites, or mixtures thereof, and organo-modified layered silicates (OMLS) as (nano)fillers, lead after melt-processing to products characterized by excellent homogeneity and interfacial properties, low cost and (synergistic) improvements of typical performances compared to the polymer matrix or to binary compositions (flame retardant—low values of maximum heat release rate and non-dripping properties during combustion, thermal stability, rigidity, process ability, etc.).

Co-addition of $CaSO_4$ and OMLS exhibits synergistic effects on PLA flame retardancy by both significantly increasing the time to ignition and decreasing the heat release rate per unit area (and more especially, the maximum heat release rate) as evidenced by cone calorimetry.

An object of the invention is to provide cost-effective highly filled compositions and a mean for producing compositions from PLA blended with $CaSO_4$ anhydrites and OMLS with enhanced fire retardant properties and simultaneously other requested characteristics. The object of the invention is preferably a halogen-free polymer composition obtained by co-addition of 20 to 50 wt % of $CaSO_4$ and 1 to 10 wt % of OMLS (and preferably 2 to 5 wt % OLMS) to polylactide-based polymer or copolymer (PLA) to provide compositions with improved flame-retardancy properties. A further feature of the present invention is the provision of a method for superior valorization of calcium sulfate obtained as major byproduct during production of lactic acid (monomeric unit of the PLA) and the preparation of PLA compositions without degradation of polyester matrix. Pretreatment of raw materials in terms of residual water content, mean diameter of mineral filler particles has demonstrated to be of prime interest to preserve specific PLA properties.

Other objects and advantages of the invention will become readily apparent from the ensuing description.

DESCRIPTION OF THE PREFERRED EMBODIMENTS

Polylactide (PLA)-polymer Matrix

The terms polylactide and poly(lactic acid) (PLA) denote polymers and copolymers including lactic acid repetitive units in their backbone whatever the polymerization production pathway (polycondensation, ring-opening polymerization). The PLA-based polymer may also contain additional components or additives including chain extenders, plasticizers, antioxidants, stabilizers, processing aids, pigments, dyes and other like.

In preferred embodiments of this invention, Examples 1-4, PLA and anhydrite fillers have the same source as origin, i.e., the production and use of lactic acid.

To be processable by using most conventional techniques, it is desirable to provide PLA with adequate number average molecular weight ($M_n$), polydispersity index ($M_w/M_n$) and melt stability. It should be appreciated that each of these parameters can be adjusted for a given application. It is well known that a PLA of low $M_n$ cannot be processed by extrusion—blowing due its low viscosity, while a PLA of very high $M_n$, cannot be suited for processing by injection.

Anhydrite II (AII): a Specific Variety of Calcium Sulfate

The presence of water, in either PLA or filler, is responsible for a drop of PLA molar mass and mechanical performances. Therefore, in a preferred embodiment, calcium sulfate derivatives have to be dried at temperatures ranging from 350 to 800° C., and more preferably from 450 to 650° C., until formation of calcium sulfate-anhydrite II (AII), a stable variety of anhydrous calcium sulfate. The weight percentage of AII is typically ranging from 20 to 50%.

Especially at high filler loadings, a compatibilizing agent may be used for better filler dispersion and adhesion properties. It can be combined with the filler before or during melt-blending process. The exact level of coupling agent for optimum composite properties depends mainly on the powders specific surface area and its chemical nature. Preferably, the filler is treated with silanes, titanates, zirconates, stearic acid and metal stearates for a weight percentage ranging from 0.1 to 2 wt % relative to the filler.

Organo-modified Layered Silicates (OMLS)

In the present invention, it is desirable to use OMLS which will form a nanocomposite by melt-blending with the PLA matrix.

The preferred OMLS are generally prepared by reacting smectite clay materials with an organic cation or cations provided by specific quaternary ammonium compounds.

In order to obtain better compatibility between the PLA and OMLS, it is desirable that the organoclay contains onium cations bearing alkyl chains. The preferred clays used to prepare the OMLS of this invention are cation-exchangeable smectite clays which have the cation exchange capacity of at least 75 milliequivalents (meq) per 100 grams of dried clay.

The preferred quaternary ammonium cations for purposes of the invention are in proportion of 75 to 150 meq per 100 g of dried clay and are selected from the group consisting of benzyl methyl dialkyl quaternary ammonium, benzyl dimethyl alkyl quaternary ammonium, bis-(2-hydroxyethyl)methyl alkyl quaternary ammonium, 2-hydroxyethyl dimethyl alkyl quaternary ammonium, dimethyl dialkyl quaternary ammonium, benzyl trialkyl quaternary ammonium and methyl trialkyl quaternary ammonium in which one or more alkyl groups represent a mixture of hydrocarbon radicals derived from tallow, hydrogenated tallow, stearyl, oleyl or cocoalkyl having from 14 to 18 carbon atoms. Some preferred quaternary ammonium cations to make the compositions of this invention are: benzyl dimethyl hydrogenated tallow ammonium—Examples 1-3; bis-(2-hydroxyethyl)methyl tallow ammonium—Example 4.

OMLS are more easily dispersed in the PLA matrix and can form both types of nanostructures or combination of them (intercalated and/or exfoliated) whereas untreated clays typically lead to ordinary micro-composites when blended with PLA matrix As used herein the term "interlayer spacing—$d_{001}$" refers to the distance between the same faces of two adjacent smectite clay layers, either in the dry state or as incorporated into a polymer. In preferred embodiments of this invention, OMLS are intercalated or (partially) exfoliated as can be deduced by using WAXS analysis, which does no longer display the presence of initial $d_{001}$ of the organo-modified clay.

The amount of OMLS utilized in the present invention is from about 1 to 10 wt %, and preferably, from about 2 to about 5 wt %, referred to the total PLA composition.

Melt-compounding and Preparation of Compositions

The compositions according to the invention may be prepared using conventional techniques, for example dry-mixing all or some of the components in a tumble mixer, followed by compounding in a wide range of melt-processing equipments such as internal mixers, single or double screw extruders, Buss kneaders, etc. Processing conditions (speed, temperatures and time) are determined by the type of equipment used, the nature of the components, the blend composition and the desired end-product. However, preferred operating temperatures are comprised between 150 to 250° C. It is worth recalling that polyester-based matrix is very sensitive to temperature, shearing and hydrolysis so that all precautions known by the man of the art should be applied. It can be necessary to limit the content of water into PLA for all compositions at 100-250 ppm whatever the processing conditions. Beyond this superior limit, the number average molar mass of PLA chains drops so fast that acceptable mechanical properties may not be reached anymore.

Flame Retardant Properties

Fire hazards result from the combination of a number of different factors (ignitability, amount of the heat released on burning, heat release rate, flame spread, etc.) and different procedures can be used for evaluation of the flame retardant properties.

According to this invention, it is preferable to determine the flame retardant properties of PLA compositions by using the oxygen consumption cone calorimeter testing(standardized as ASTM E 1354 and ISO 5660). It has been considered that the heat release rate (HRR) is one of the most important parameter and usually, a high heat release rate causes fast ignition and flame spread. In typical cone calorimeter experiments the polymer samples were exposed to a defined heat flux of 35 kW/m². Simultaneously the peak of heat release—PHRR, time to ignition—$T_{ig}$, total heat released, mass loss rate, mean CO yield and mean specific extinction area, for example, were measured.

The surprising finding is that by comparison to PLA (or to binary compositions (PLA-anhydrite, PLA-OMLS)), co-addition of $CaSO_4$ and OMLS exhibits synergistic effects on PLA flame retardancy by both significantly increasing the time to ignition ($T_{ig}$) and decreasing PHRR, as illustrated in Examples 1, 2, 4.

On the other hand, by comparison to binary compositions (PLA-anhydrite, PLA-OMLS)), co-addition of $CaSO_4$ and OMLS leads to flame-retardant compositions that exhibit significantly decreasing of PHRR as illustrated in Examples 1, 2, 4.

To have information about the anti-dripping properties or the speed (rate) of combustion, PLA compositions may be characterized by using other testing procedures as UL 94HB (Underwriters Laboratories), Glow Wire Test (CEI IEC 6095-2), Federal Motor Vehicle Safety Standard (FMVSS) 302-Flammability of materials used in the occupant compartments of motor vehicles, etc.

The blends that contain only PLA or even high amount of filler, e.g., about 40-50 wt % of $CaSO_4$ anhydrite, are characterized by dripping and no charring properties compared to the ternary compositions, —(comparative examples C, D and F).

The PLA blends that contain only OMLS are characterized by charring properties but higher speed of burning (compared to PLA and PLA $CaSO_4$ anhydrites binary compositions)—comparative examples B and F.

However, if both OMLS and $CaSO_4$ anhydrites are added into PLA compositions (Examples 1-4), synergistic flame retardant properties (low speed of burning, no dripping and charring formation) are evidenced. This indicates that a combination of $CaSO_4$-anhydrite and OMLS is required for better fire retardant properties.

Other Properties

The present invention also aims maintaining or improving other specific PLA properties such as thermal stability, rigidity, etc. Finally, co-addition of $CaSO_4$ and OMLS leads to PLA compositions characterized by low-cost and excellent processing properties (isotropic shrinkage, low shrinkage, high productivity etc.).

PLA compositions according to the invention are suitable for traditional melt-processing techniques, e.g., injection molding, extrusion or other techniques suitable for specific applications (packaging, insulator films and sheets, electrical and electronic components, automotive parts, electrical engineering etc.) having increased requirements in terms of flame resistant behavior.

Table 1 shows ranges of acceptable and preferred weight percents of the PLA compositions, relative to total weight compound, for a preferred embodiment of the invention.

TABLE 1

| Component of the blend | Acceptable (wt-%) | Preferred (wt-%) |
|---|---|---|
| PLA homopolymer or copolymer | 79-40 | 68-55 |
| Calcium sulfate anhydrite | 20-50 | 30-40 |
| OMLS | 1-10 | 2-5 |

EXAMPLES

Example 1 and Comparative Examples A, B and C

Effect of Filler Combination

Two products with the same source as origin, i.e., issued from the production and use of lactic acid, PLA and one main byproduct—calcium sulfate, have been used for experiments. PLA-Galastic and calcium sulfate hemihydrate ($CaSO_4 \times 0.5H_2O$) with a mean diameter ($d_{50}$) of 9 microns were both supplied by Galactic sa. The filler was dried at 500° C. for one hour to produce calcium sulfate-anhydrite II (AII).

PLA characteristics were as follows: $M_{n(PLA)}$=74500, polydispersity index=2.1, D-isomer=4.3%, residual monomer=0.18%, melt flow index (190° C., 2.16 kg)=6.6 g/10 min. PLA was intensively dried at 110° C. under vacuum for 4 hours before melt-mixing.

An OMLS supplied as Bentone® 104 product-code B104 (supplier—"Elementis Specialties") in which the exchange cation is benzyl dimethyl hydrogenated tallow ammonium (131 meq/100 g clay) was used for melt-blending experiments after a previous drying for 90 minutes at 130° C. under vacuum.

A PLA-B104 composition prepared by dry-mixing was melt-blended at 190° C. (moderate mixing with cam blades) by using a Brabender bench scale kneader (3 min, 30 rpm). After addition of AII this step was followed by mixing at higher shear (60 rpm) during 3 min. Plates from the resulting composition—PLA-3% B104-40% AII (3 mm thickness) were then formed by compression molding at 190° C. by using Agila PE20 hydraulic press.

Specimens for tensile and impact testing were made from plates by using a milling-machine, in accordance with the ASTM D 638-02a norm (specimens type V) and ASTM D-256 norm (specimens 60×10×3 mm), respectively.

For determination of flame retardant properties, PLA specimens (plates 100×100×3 mm) were exposed, in Stanton Redcroft Cone Calorimeter, to an external heat flux of 35 kW/m². Minimum two tests were carried out on each material.

The samples were also characterized by using additional tests that can give more information about the anti-dripping properties or speed of combustion (UL 94, HB classification).

To have information concerning the dispersion of fillers, different techniques of analysis have been applied. Scanning electron microscopy (SEM) analyses evidenced a thorough and homogeneous dispersion of AII filler into PLA matrix without presence of any agglomerates, whereas structure at nano-scale of OMLS was analysed by WAXS. According to the WAXS analysis of PLA-40% AII-3% B104 compositions—Example 1, it was found that the characteristic peak of B104, corresponding to a $d_{(001)}$ distance of 20.1 Å, was shifted to lower two-theta angle in the ternary PLA (nano) composite (new $d_{(001)}$ corresponding to a distance of approx. 35 Å) so that it could be concluded that for these compositions an important amount of intercalation/exfoliation of OMLS had occurred during melt-mixing. Even in presence of a high amount of AII filler, the initial peak characteristic for B104 disappeared by melt-blending due to intercalation of PLA between silicate layers.

For sake of comparison, PLA (Galastic) alone or in independent combinations with B104 or AII were also submitted to the same processing conditions (comparative examples A, B and C).

Table 2 shows the properties of "PLA-3% B104-40% AII" compositions obtained by co-addition of AII and B104 into PLA compared to pristine PLA or to binary PLA compositions.

determined by applying a horizontal burning procedure (UL 94 HB).

The testing according to UL 94 HB method (Table 2) confirms both properties for the ternary compositions (Example 1), anti-dripping properties and evident low burning rate compared to binary compositions (B and C). The ternary composition clearly passes the UL 94 HB test while both binary compositions fail this test.

TABLE 2

|  | Comparative examples | | | Example |
|---|---|---|---|---|
|  | A | B | C | Example 1 |
| Properties | PLA | PLA-3% B104 | PLA-40% AII | PLA-40% AII-3% B104 |
| PLA molecular weights | | | | |
| $M_{n\,(PLA)}$ | 63 600 | 53 400 | 63 400 | 56 800 |
| Polydispersity index | 2.2 | 1.9 | 2.2 | 2.0 |
| Flame retardant properties | | | | |
| Cone calorimeter testing | | | | |
| Ignition time, s | 75 | 75 | 95 | 88 |
| Peak of HRR, kW/m$^2$ | 374 | 285 | 315 | 217 |
| UL-94HB* | | | | |
| Anti-dripping properties | NO | YES | NO | YES |
| Charring | NO | YES | NO | YES |
| Mean burning rate, mm/min | 25 | 47 | 40 | 33 |
| Classification UL94 HB** | Pass | Fail | On limit | Pass |
| Thermal and mechanical properties | | | | |
| TGA data*** | | | | |
| Temperature of 5% weight loss, °C. | 334 | 345 | 340 | 353 |
| Temperature of 50% weight loss, °C. | 367 | 383 | 389 | 399 |
| Mechanical properties | | | | |
| Young's modulus, MPa (v = 1 mm/min) | 1440 ± 140 | 960 ± 430 | 2260 ± 120 | 2430 ± 270 |
| Tensile strength at break, MPa | 61 ± 1 | 46 ± 6 | 48 ± 1 | 36 ± 2 |
| Notched impact strength Izod (method A****), kJ/m$^2$ | 2.6 ± 0.2 | 2.6 ± 0.3 | 1.5 ± 0.7 | 1.4 ± 0.2 |
| Compound cost vs. PLA | — | Higher | Lower | Lower |

*specimens 125 × 12.7 × 3 mm;
**speed of combustion lower than 40 mm/min.
***under air, heating rate 20° C./minute;
****specimens 60 × 10 × 3 mm It is evident that, without recording an important degradation of PLA matrix, co-addition of two phases that are dispersed at nano- (B104) and micro-scale (AII) leads to surprising properties compared to the neat PLA (thermal stability, flame retardant, rigidity—as could be observed in Table 2) and to improved processing, e.g., isotropic shrinkage, low values of shrinkage, etc., at a lower cost. It has been found that co-addition of B104 and AII according to the invention leads to a increase of rigidity (value of Young's modulus of 2430 MPa) and most important, to synergetic performances concerning the flame retardant properties as determined by cone calorimeter testing (low PHRR and high $T_{ig}$) where the ternary composition—Example 1, is compared to PLA or to binary compositions (comparative examples A, B and C).

On the other hand it is well-known that PLA or micro-filled PLA are burning with dripping (without charring) which limits its utilisation especially in electrical applications. It is in sharp contrast with ternary PLA-B104-AII compositions. Table 2 shows the properties of "PLA-3% B104-40% AII" compositions compared to binary PLA compositions as Examples 1, 2 and 3, Comparative Examples D and E Variation of Filler Quantities In similar experimental conditions to Example 1, ternary compositions PLA-B104-AII were realized by modifying the percentage of nanofiller (B104) and micro-filler (AII).

For sake of comparison, PLA (Galastic) in combination with different contents in anhydrite II were also submitted to the same processing conditions (comparative examples D and E).

The horizontal burning procedure according to UL 94 HB (Table 3) indicates improved burning rate values for the ternary compositions and more specifically when 40 wt % AII and 3 wt % B104 are added (compare Example 1 with 2 and 3). Combination of filler is also necessary to promote charring and anti-dripping properties. Cone calorimeter analysis indicates that ternary compositions exhibit low peak of HRR, compared to binary compositions (comparative examples D and E). It has to be noted that increasing too much the amount of AII (comparative example E) leads to a significant decrease in the ignition time in binary compositions.

TABLE 3

| | Examples | | | | |
|---|---|---|---|---|---|
| | Example 1 | Example 2 | Example 3 | Comparative example D | Comparative example E |
| Properties | | | Composition | | |
| | PLA-40% AII-3% B104 | PLA-40% AII-6% B104 | PLA-30% AII-3% B104 | PLA-43% AII | PLA-50% AII |
| Cone calorimeter testing | | | | | |
| Ignition time, s | 88 | 83 | n.a. | 98 | 72 |
| Peak of HRR, kW/m$^2$ | 217 | 248 | | 319 | 298 |
| UL-94HB | | | | | |
| Anti-dripping properties | YES | YES | YES | NO | NO |
| Charring | YES | YES | YES | NO | NO |
| Mean burning rate, mm/min | 33 | 25 | 42 | 24 | 35 |
| Classification UL94 HB | Pass | Pass | Fail | Pass | Pass | n.a.: not assessed

Examples 1, 4, Comparative Examples F and G

Variation of Filler Nature

In similar experimental conditions to Example 1, an OMLS supplied as Cloisite® 30B-noted C30B (Southern Clay Products, Inc. —USA) in which the exchanged cation is bis-(2-hydroxyethyl)methyl hydrogenated tallow ammonium (90 meq/100 g clay) was used for melt-blending experiments after a previous drying for one hour at 150° C. under vacuum.

WAXS diffractograms of PLA-40% AII-3% C30B compositions—Example 4, shown a shift of the characteristic peak of C30B (two-theta angle of 4.8 degrees corresponding to $d_{001}$ of approximately 18.4 Å) to lower two-theta angle so that it could be concluded that for these compositions an important amount of intercalation/exfoliation of OMLS had occurred during melt-mixing.

For sake of comparison, a filled composition PLA-3% C30B was also submitted to the same processing conditions (comparative example F).

Another micro-filler, calcium carbonate (CaCO$_3$, Socal 311, from Solvay) has also been tested in PLA at 40 wt %, for the sake of comparison (comparative example G)

Testing of flame retardant properties (Table 4) by applying different procedures confirms important flame retardant properties for the ternary compositions.

In ternary compositions, C30B provided comparable effect on cone calorimeter and UL-94-HB tests in terms of reduction of PHRR, mean burning rate and increase in ignition time (compare Example 1 and 4 and compare Example 4 with comparative example F) Interestingly, the ignition time of a PLA-40% CaCO$_3$ composition (comparative example G) was approximately two times smaller and displayed relatively poor reduction in PHRR. Such a behaviour can be correlated to the spherical form of primary particles of CaCO$_3$, compared to a form of platelets that is typically for AII particles, indicating that the morphology of the micro-filler can have a significant importance.

It is important to remark that the flame retardant properties for the composition obtained according to the Example 4 were evidenced also according to FMVSS procedure. These compositions are characterized by lower burning rates compared to PLA, i.e., 11 mm/min compared to 17 mm/min, respectively.

Ternary compositions—PLA-AII-OMLS obtained according to the example 4 has been selected for additional flame retardant characterizations, i.e., the glow wire testing and compared to the neat PLA.

The results are given in Table 5 and show that during testing, by comparing to PLA, the specimens performed by using the ternary composition Example 4 were not penetrated

TABLE 4

| | Examples | | | |
|---|---|---|---|---|
| | Example 1 | Example 4 | Comparative example F | Comparative example G |
| Properties | | Composition | | |
| | PLA-40% AII-3% B104 | PLA-40% AII-3% C30B | PLA-3% C30B | PLA-40% CaCO$_3$ |
| Cone calorimeter testing | | | | |
| Ignition time, s | 88 | 88 | 62 | 48 |
| Peak of HRR, kW/m$^{2\,mean}$ | 217 | 230 | 244 | 279 |
| UL-94HB | | | | |
| Anti-dripping properties | YES | YES | YES | n.a. |
| Charring | YES | YES | YES | |
| Mean burning rate, mm/min | 33 | 30 | 42 | |
| Classification UL94 HB | Pass | Pass | Fail | | n.a.: not assessed by the glow wire, which can be correlated to improved flame retardant properties during utilization.

TABLE 5

| Properties | Example 4 | Comparative example A |
|---|---|---|
| | Compositions | |
| | PLA-40% AII-3% C30B | PLA |
| Glow wire test | | |
| Glow wire flammability, ° C. | 825 | 825 |
| Penetration depth at pressing force 1 N | The specimen is not penetrated | The specimen is penetrated |

Finally, it is also worth pointing out that, in comparison with neat PLA, a high quality of the surface in terms of isotropic shrinkage and dimensional stability was observed for the plates made using ternary compositions by compression molding.

Unless otherwise indicated, characteristics in the claims are measured or determined in accordance with the details and procedures described in the examples.

The invention claimed is:

1. A polylactide-based polymer or copolymer (PLA) composition comprising 40-79 wt % PLA, 20 to 50 wt % of calcium sulfate anhydrite and 1 to 10 wt % of organo-modified layered silicates (OMLS).

2. A polylactide-based polymer or copolymer (PLA) composition in accordance with claim 1, in which the composition comprises 55-68 wt % PLA, 30 to 40 wt % of calcium sulfate anhydrite and 2 to 5 wt % of organo-modified layered silicates (OMLS).

3. A polylactide-based polymer or copolymer (PLA) composition in accordance with claim 1 in which the composition has at least one of the following characteristics (a), (b), (c):
   a) an ignition time, when subjected to a cone calorimeter test at 35 kW/m$^2$, of
      (a) (1) 80 seconds or more, or
      (a) (2) 85 seconds or more;
   b) a peak Heat Release Rate, when subjected to a cone calorimeter test measured by consummation of oxygen at 35 kW/m$^2$, of
      (b)(1) 240 kW/m$^2$ or less, or
      (b)(2) 230 kW/m$^2$ or less;
   c) anti-dripping properties with a pass classification measured in accordance with UL-94HB.

4. A polylactide-based polymer or copolymer (PLA) composition in accordance with claim 3 in which the composition has at least two of the characteristics (a), (b), (c).

5. A polylactide-based polymer or copolymer (PLA) composition in accordance with claim 3 in which the composition has all three of the characteristics(a), (b), (c).

6. A polylactide-based polymer or copolymer (PLA) composition in accordance with claim 1, in which the composition passes the CEI IEC 6095-2 Glow wire test at 825 ° C.

7. A polylactide-based polymer or copolymer (PLA) composition in accordance with claim 1, in which the composition has at least one of the following characteristics (a), (b), (c):
   a) a Young's modulus of
      (a)(1) 1300 MPa or more, or
      (a)(2) 2400 MPa or more;
   b) a tensile strength at break of
      (b)(1) 20 MPa or more, or
      (b)(2) 30 MPa or more;
   c) a notched impact strength of
      (c)(1) 1.2 kJ/m$^2$ or more, or
      (c)(2) 1.4 kJ/m$^2$ or more.

8. A polylactide-based polymer or copolymer (PLA) composition in accordance with claim 1, in which the calcium sulfate anhydrite has a mean particle diameter ($d_{50}$) in the range 2 microns to 15 microns.

9. A polylactide-based polymer or copolymer (PLA) composition in accordance with claim 1, in which the composition is substantially halogen free.

10. A polylactide-based polymer or copolymer (PLA) composition in accordance with claim 1, in which the composition contains less than 5 ppm of halogens.

11. A polylactide-based polymer or copolymer (PLA) composition in accordance with claim 1, in which the composition is substantially free of phosphorus.

12. A polylactide-based polymer or copolymer (PLA) composition in accordance with claim 1, in which the composition contains less than 5 ppm of phosphorus.

13. A polylactide-based polymer or copolymer (PLA) composition in accordance with claim 1, in which the organo-modified layered silicates (OMLS) are selected from:
   (a) the group of smectite clay materials, or
   (b) montmorillonite, nontronite, beidellite, bentonite, hectorite, fluorohectorite, saponite, sauconite, stevensite and mixtures thereof.

14. A polylactide-based polymer or copolymer (PLA) composition in accordance with claim 13, in which the smectite clay is modified with quaternary ammonium compounds for a weight proportion of 75 to 150 milliequivalents of quaternary ammonium cation per 100 g of dried clay.

15. A polylactide-based polymer or copolymer (PLA) composition in accordance with claim 14, in which the quaternary ammonium cation is selected from the group consisting of benzyl methyl dialkyl quaternary ammonium, benzyl dimethyl alkyl quaternary ammonium, bis-(2-hydroxyethyl) methyl alkyl quaternary ammonium, 2- hydroxyethyl dimethyl alkyl quaternary ammonium, dimethyl dialkyl quaternary ammonium, benzyl trialkyl quaternary ammonium and methyl trialkyl quaternary ammonium in which one or more alkyl group represent a mixture of hydrocarbon radicals derived from tallowalkyl, hydrogeneated tallowalkyl, stearyl, oleyl or cocoalkyl having from 14 to 18 carbon atoms.

16. A polylactide-based polymer or copolymer (PLA) composition in accordance with claim 2, in which the calcium sulfate anhydrite is calcium sulfate anhydrite II.

17. A polylactide-based polymer or copolymer (PLA) composition in accordance with claim 1, in which the calcium sulfate anyhydrite is calcium sulfate-anhydrite II.

18. A method of making a polylactide-based polymer or copolymer (PLA) composition in accordance with claim 1 in which the PLA and calcium sulfate anhydrite are obtained from renewable resources by a fermentation process.

19. A method of making a polylactide-based polymer or copolymer (PLA) composition in accordance with claim 1 in which the calcium sulfate anhydrite is obtained from a hydrated form of calcium sulfate by adequate thermal treatment at temperatures from 350° C. to 800° C.

20. A method of making a polylactide-based polymer or copolymer (PLA) composition in accordance with claim 1 in which the calcium sulfate anhydrite is obtained from a hydrated form of calcium sulfate by adequate thermal treatment at temperatures from 450° to 650° C.

21. A method of making a polylactide-based polymer or copolymer (PLA) composition in accordance with claim 1 in which the calcium sulfate anhydrite is obtained after surface treatment by coupling and/or coating agents for an amount from 0.1 % to 2 wt %.

22. A method of making a polylactide-based polymer or copolymer (PLA) composition in accordance with claim 1 in which extensively dried PLA and other components are melt-compounded at temperatures from 150° C. to 250° C. to obtain homogeneous composites with micro-scale dispersion of calcium sulfate anhydrite and nano-scale dispersion of organo-modified layered silicate (OMLS).

23. An article comprising a polylactide-based polymer or copolymer (PLA) composition in accordance with claim 1 in which the article is selected from the group consisting of: a packaging, an insulator film, an insulator sheet, an electrical or electronic component of office equipments, a monitor, a computer, a printer, an automotive or mechanical part, an electrical connector, relay, switch, coil or bobbin.

* * * * *